A. R. SIMMERLY.
COLLET.
APPLICATION FILED JAN. 26, 1909.

970,129.  Patented Sept. 13, 1910.

Inventor
Anthony R Simmerly

Witnesses

By

Attorney

UNITED STATES PATENT OFFICE.

ANTHONY R. SIMMERLY, OF CLEVELAND, OHIO.

COLLET.

970,129.  Specification of Letters Patent.  Patented Sept. 13, 1910.

Application filed January 26, 1909. Serial No. 474,248.

*To all whom it may concern:*

Be it known that I, ANTHONY R. SIMMERLY, a citizen of the United States, residing at Cleveland, in the county of Cuyahoga and State of Ohio, have invented certain new and useful Improvements in Collets, of which the following is a specification.

This invention relates to collets or sockets adapted for use in connection with drill presses, and has for its object to provide an improved device for holding a locking block in position in the collet, to engage a tang which has been broken off.

Figure 1:
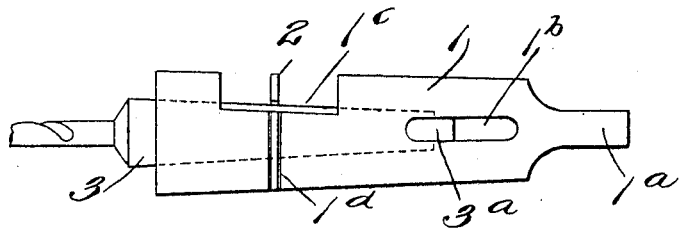
Figure 2:
Figure 3:
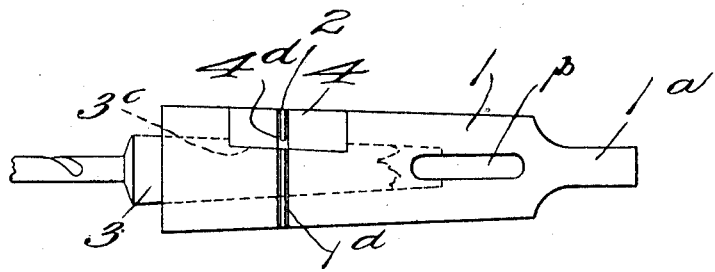
Figure 4:
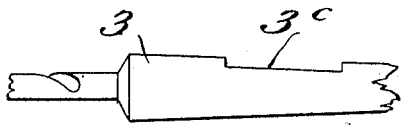

In the drawings, Figure 1 is a side view of the collet with a drill therein; Fig. 2 is a perspective view of the key or securing member used with broken drills; Fig. 3 is a side view of the collet with a drill therein the tang of which has been broken off. Fig. 4 is a side view of such a drill.

The collet 1 has the usual tang 1$^a$ and cross way or opening 1$^b$, the latter at the inner end of the tapered recess or socket which receives the shank 3 of the drill. The tang 3$^a$ of the drill is flattened to fit in the recess as usual, in order to communicate the twist or rotary motion. An unbroken or ordinary drill is used as shown in Fig. 1, the locking member 4 being omitted. The side of the collet has a recess 1$^c$ cut across the same deep enough to communicate with the socket.

The locking member 4 is a piece having a segmental outer surface and a flat inner surface, of proper size and shape to conform to the size and shape of the recess 1$^c$ within which it will fit snugly. The locking member is held in place by means of a spring 2, the collet being grooved as at 1$^d$ and the piece 4 being grooved as at 4$^d$ sufficiently deep to allow the wire to lie within the exterior surface of the collet, so as to not interfere with its fit in the sleeve of the drill press. The sole purpose of this spring is to hold the locking member in place, against accidental dislodgment.

When a drill with a broken tang is to be used, the shank of the drill is recessed as at 3$^c$, in a position corresponding to the recess 1$^c$ in the collet, and sufficiently deep for the bottom of the recess 3$^c$ to be flush with the inner edge of the recess 1$^c$. The shank of the drill is then inserted in the socket and the locking piece 4 is forced into place under the spring 2 and is held thereby. Then when the collet is inserted in the sleeve of the drill press spindle the flattened surface of the piece 4 will bear against the bottom of the recess 3$^c$ and prevent the drill turning in the socket. The piece 4 is held in place by the fit of the collet in the drill press sleeve and accordingly receives the friction of said sleeve the same as the other parts of the surface of the collet. A nice fit of the recess 3$^c$ is unnecessary, because even if too much be filed off and the recess be made too deep, the flattened part will contact with the locking member and the drill will drive just the same. The outside pressure on the member 4 locks the same to the shank of the drill and forms in effect a solid connection between the drill spindle and the drill. When the collet and drill are removed from the spindle the drill can be instantly taken out by hand, by simply loosening the segment 4. As shown in Fig. 1, the segment will be omitted when an unbroken drill is used.

The device has a decided advantage over keys and the like which have to be driven in through openings in the socket and which necessarily cannot be removed except by putting the tool in a vice or the like and knocking out the key.

It will be observed that the outer surface of the locking block is flush with the outer surface of the collet, and so makes a close fit in the usual drill spindle.

It will be noticed that the retaining spring 2 is split at one side, and can be turned in its groove. This is advantageous in placing and removing the locking block 4. Thus, to insert the block in place, the spring is adjusted so that the opening between the ends thereof is adjacent the edge of the recess in the collet, as shown in Fig. 1, in which position the side edge of the block can be inserted between the ends of the spring, thus acting as a wedge, the ends of the spring being forced apart as the block enters, and closing when the block is in position in the recess. To remove the block it is simply necessary to push the same in reverse direction between the ends of the spring, located as before. The spring need not be removed from the collet, and the ends of the spring do not have to be separated by hand in order to insert or remove the block.

I claim:

A collet having a segmental recess in the side thereof, a segmental locking member fitting in said recess and adapted to engage the shank of a tool in the socket of the collet, the outer surface of the collet and said locking member having registering grooves, and a split ring fitting and rotatable in said grooves and around the collet and locking member, to hold the latter in place.

In testimony whereof, I affix my signature in presence of two witnesses.

ANTHONY R. SIMMERLY.

Witnesses:
 JOHN A. BOMMHARDT,
 MONROE E. MILLER.